INVENTOR.
Joseph R. Orton

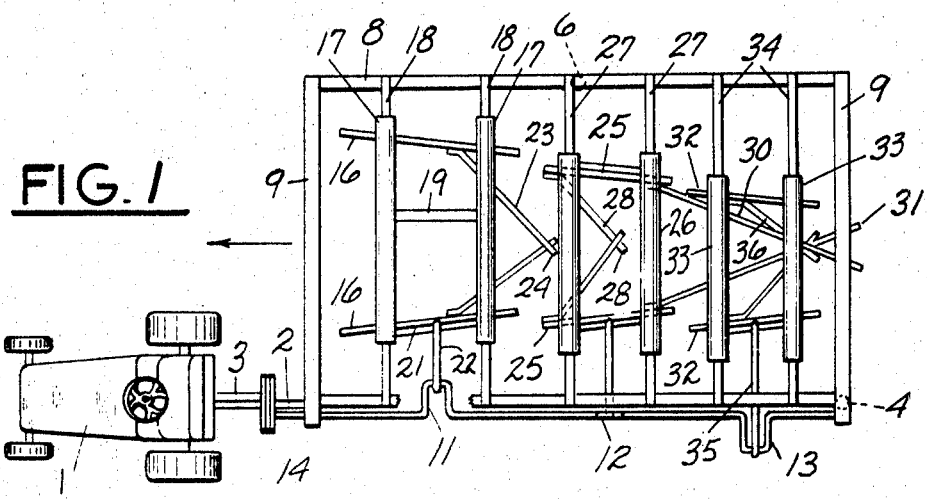
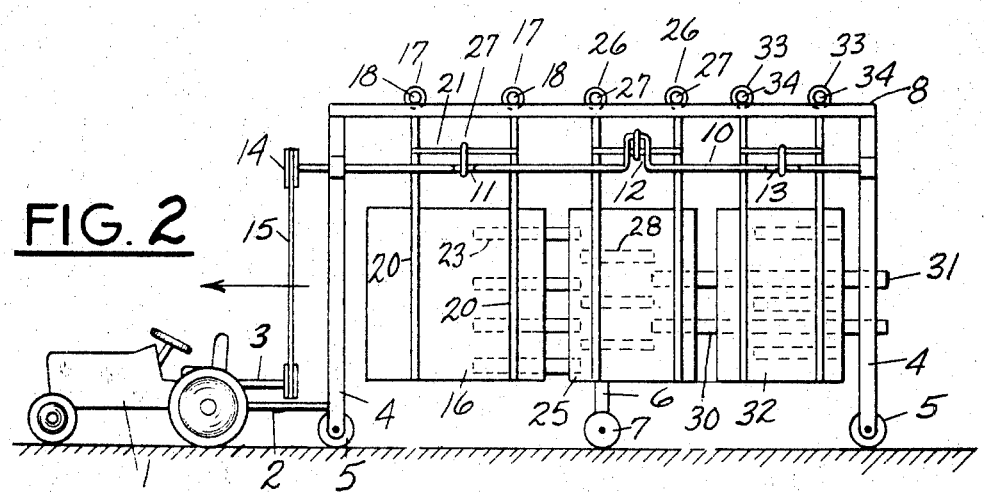
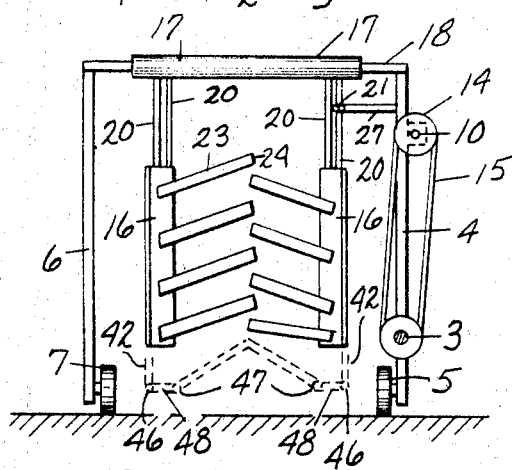

United States Patent Office 3,439,482
Patented Apr. 22, 1969

3,439,482
GRAPE HARVESTING MACHINE
Joseph R. Orton, Ripley, N.Y., assignor to Chisholm-Ryder Company, Inc., Niagara Falls, N.Y., a corporation of New York
Continuation of application Ser. No. 448,518, Apr. 15, 1965. This application Feb. 29, 1968, Ser. No. 709,352
Int. Cl. A01g *19/00*
U.S. Cl. 56—330     21 Claims

ABSTRACT OF THE DISCLOSURE

The frame of the mobile harvester travels along opposite sides of a row of grape vines or the like trained on a trellis wire and on opposite sides of the row has groups of generally horizontal flexible bars extending lengthwise of the row and moved horizontally back and forth crosswise of the row and vertically positioned to engage and shake the top, bottom and intermediate part of the fruit bearing growth. The flexible bars have their trailing ends converging toward, and preferably crossing, each other at the center of the row to grip and shake the vines so that grapes at the center of the row are shaken free as well as the grapes growing along the outside of the row. Vertical side panels guide the grapes to bottom conveyors. Between the conveyors the falling grapes are guided onto the conveyors by rows of flexible bodied arms each row being covered by a flexible covering the edges of which, along the free ends of the flexible arms, meet at the center of the row of vines and forming a peak shedding the grapes onto the conveyors.

Cross reference to related application

This is a continuation of copending application Ser. No. 448,518 and now abandoned.

Description of drawings

In the drawing, FIG. 1 is a top plan view of a grape harvesting machine; FIG. 2 is a side elevation of the machine; FIG. 3 is an elevation of the front end of the machine looking backwards with respect to its direction of travel.

Description of preferred embodiment

Figure 4:
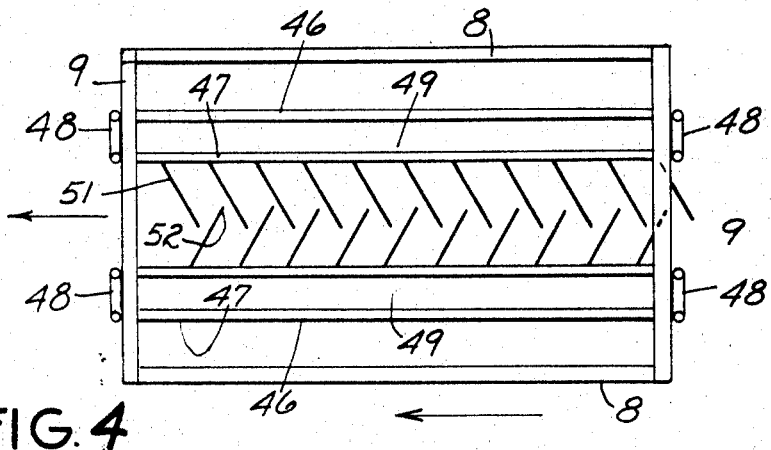
FIG. 4 is a top plan view of the grape catcher.

The grape harvesting machine conveniently may be drawn by a tractor 1 having a draw-bar 2 which pulls the machine and a power take-off shaft 3 which supplies power to the machine.

The machine has a frame which straddles the row of grapes to be harvested. The frame comprises longitudinally spaced uprights 4 on one side of the row supported by caster wheels 5 and an upright 6 on the opposite side of the row supported by a caster wheel 7. For side hill operation the casters may have levelling devices. At the upper ends, the uprights 4 and 6 support a generally rectangular frame comprising longitudinal members 8 and cross members 9. Additional bracing is provided but is omitted for the purpose of clarity of illustration. The uprights 4 and 6 straddle the row of grapes being harvested and the top frame consisting of the longitudinal and cross members 8 and 9 rides above the top of the row.

Harvesting of the grapes is on the shaking principle, the power for the shaking being derived from a longitudinally extending crankshaft 10 suitably journalled in uprights 4 and having crank throws 11, 12 and 13 spaced 120 degrees apart. At the front end of the crankshaft 10 is a pulley 14 having a belt drive 15 from the power take-off shaft 3. By way of example, and not by way of limitation, the speed of the crankshaft may be of the order of 250 to 400 revolutions per minute and the stroke may be of the order of two to three inches.

As the harvesting machine is drawn along the row of grapes, the vines are in effect funneled between shakers which shake the vines with progressively increasing intensity so that when the shakers are finished, no grapes remain on the vines. The shakers crowd the grapevines toward the center of the row and accomplish the shaking with negligible damage to the vines.

At the front or entering end of the machine are vertical plates 16 suspended by a frame having slides 17 carried on crossbars 18 extending between the longitudinal frame members 8. The slides are connected by a cross brace 19 and have fixed thereto depending vertical frame members 20 fixed to the plates 16. Between the vertical members 20 is a cross member 21 connected by a connecting rod 22 to the crank throw 11. As shown in FIG. 1, the plates 16 are most widely separated at the entering or leading end and converge toward the exit or trailing end. Fixed to the trailing end of the plates 16 are a plurality of generally horizontal vertically spaced flexible bars 23 which converge at an acute angle toward the center of the row and preferably are slightly overlapped at their free or unsupported ends 24. The bars 23 are preferably in staggered relation to each other. The purpose of the flexible bars 23 is to impart a shaking action to the grapevines without injuring the grapes. The shaker bars 23 shake the parts of the vines toward the center of the row. The free ends of the bars 23 project well between plates 25 similarly suspended from slides 26 on crossbars 27 extending between the longitudinal frame members 8. The plates 25 are likewise most widely separated at the leading ends and most closely separated at the trailing ends. Fixed to the inner sides of the plates 25 adjacent the leading edges are a plurality of sharply converging bars 28 each making an acute angle with the center of the row and each having free ends 29 in overlapping relation at the center of the plates 25. The bars 28 are flexible and are preferably in staggered relation to each other and to the bars 23 when viewed endwise of the row. Adjacent the trailing edges of the plates 25 are fixed a plurality of long shaker bars 30 having free or unsupported ends 31 overlapping and projecting beyond the trailing end of the machine. The shaker bars 30 extend at an acute angle to the center of the row between plates 32 fixed to slides 33 on crossbars 34 extending between the longitudinal frame members 8 and reciprocated by connecting rod 35 connected to crank throw 13. The plates 32 are the most closely spaced. The plates 32 carry flexible shaker bars 36 fixed to the leading edges of the plates and at an acute angle to the center of the row converging toward the trailing edges of the plates 32. The shaker bars 36 are preferably in staggered relation to each other and to the bars 30 so that each bar acts independently on a different portion of the grapevine. The free ends 36a preferably overlap in the same manner as the free ends of the bars 23, 28, 30.

As an example of dimensions, and not by way of limitation, the plates 16 may be approximately four feet by four feet converging from a lateral spacing of three feet at the entering or leading end to a spacing of two and one-half feet at the trailing end. The plates 25 may be two and one-half feet wide and four feet high converging from a spacing of substantially one and three-quarters feet at the entering end to a spacing of one and one-quarter feet at the trailing end. The plates 32 may be two and one-half feet wide converging from a spacing of one and one-half feet at the leading end to a spacing of three-quarters of a foot at the trailing end. All of the plates may conveniently be made of plywood. The shaker bars 23, 28 and 36 may have a length of substantially two feet and the shaker bars 30 may have a length of substantially five feet. The shaker bars may be made of wood suitably fixed at one end to the plates.

It will thus be seen that the machine includes a frame having shaker means thereon arranged in generally transverse alignment on opposite sides of the row of plants along which the machine is continuously movable, the shaker means having portions which penetrate concurrently the foliage of the plants from opposite sides so as to produce a gripping engagement with the plants while sliding along the row.

Figure 6:
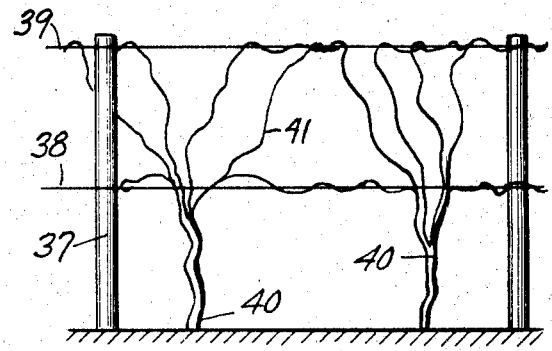
FIG. 6 is a side view of a row of grapevines.
Figure 7:
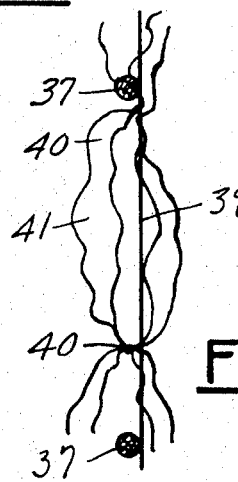
FIG. 7 is a top view of the row of grapevines.

The operation may be best explained with reference to FIGS. 6 and 7 which show a typical row of grapes having posts 37, for example on twenty-four foot centers, carrying vine supporting wires 38 and 39 respectively three and six feet above the ground. On suitable spacing between the posts are grape vines 40 having new or bearing growth 41 primarily between the wires 38, 39 and of course bulging on opposite sides of the center line of the row. The average width of the grapevine at the time of harvest is approximately four feet. The grapevines are grown in standard rows so that the crossbars 9 clear the upper ends of the posts and the grape harvesting machine can be drawn along the row without interference. Substantially all of the fruit is in the region between the wires 38 and 39. As the harvesting machine is drawn along the row, the vines are first funneled between the machine and then subjected to a progressively vigorous shaking, dislodging the grapes without injuring the vines. The vines are gripped between the ends 24, 29, 31, 36a of the bars 23, 28, 30 and 36 which impart the shaking action. The sliding contact between the ends of the bars and the vines as the machine is drawn along the row continuously changes the grip without injury to the vines. The spacing of the plates is such that the posts 37 freely pass between the plates under any conditions. The flexibility of the shaker bars 23, 28, 30, 36 permits occasional contact with the posts 37 without injury. Because of the out of phase arrangement of the crank throws 11, 12 and 13, there is no dissipation of the shaking force due to swaying of the vines. The high speed shaking is advantageous. The grapes which are shaken off the vines drop freely between the plates ahead of the shaker bars and are caught in catchers to be described which likewise are designed so as to pass freely along the row without interference. The bars do not knock individual bunches of grapes off the vines. The plates 16, 25, 32 intercept grapes thrown laterally of the row so all grapes fall onto the catchers.

The grape catchers are supported by a frame having uprights 42, 42a pivoted at 43, 43a on crossbars 9 and tied together by a cross link 44 so that the lower ends of the catcher may move laterally independently of each other in the direction of arrow 45 in order to follow the row. Other expedients for supporting the catchers for independent lateral movement with respect to the row may be used such as, for example, slides used to support the plates. The lower ends of the uprights 42 are connected to a frame comprising longitudinal bars 46 and 47 and crossbars 48. The frame 46-48 is supported slightly above the surface of the ground and carries a suitable horizontal floor or supporting surface 49 for receiving the grapes. The supporting surface 49 may be fixed to the frame 46-48 or it may be a conveyor belt suitably powered to deliver the grapes to one end of the frame.

Figure 5:
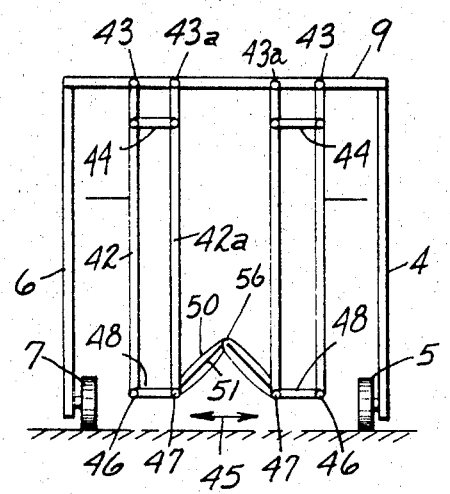
FIG. 5 is an end view of the grape catcher.

The longitudinal frame members 47 carry a flexible peaked structure 50 on which most of the grapes initially land. The purpose of this structure is to deflect the grapes onto the adjoining surfaces 49 where the grapes may be delivered to suitable containers. A convenient structure comprises flexible steel teeth 51 fixed at one end to longitudinal member 47 and having free ends 52 substantially meeting or slightly overlapping at the center. As shown in FIG. 5, the teeth 51 incline upwardly to form a peak which sheds the grapes laterally. As shown in FIG. 4, the teeth incline rearwardly as regards the direction of travel of the harvesting machine so that upon encountering a grapevine 40 or a grape post 37, the teeth are free to yield and will snap back into place. Also, if the yielding of the teeth 51 is insufficient, each frame 42-49 may swing laterally to prevent damage to grapevines. The weight of each frame 42-49 ordinarily biases it toward the center of the row, but supplemental biasing means may be provided if necessary. The yielding of the teeth and of the catcher frames prevents damage to the grapevines and also prevents damage to the grape catching structure.

Figure 5A:
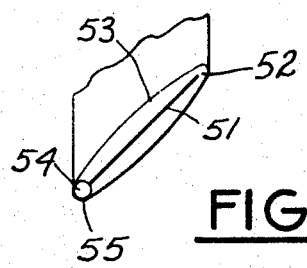
FIG. 5a is a detail of the grape catcher.

Each set of teeth as shown in FIG. 5a is covered with a flexible sheet 53 of suitable fabric or other flexible material which extends the full length of each side of the peaked structure 50 and provides a continuous sloped surface on which the grapes initially land. The covering 53 need only be attached at its edges 54, 55 to the longitudinal frame members 47 and be loosely looped over the flexible teeth 51 as shown in FIG. 5a. This permits individual movement of the teeth 51 with respect to each other without interfering with the integrity of the grape receiving surface provided by the cover 53. The cover 53 moves upwardly or outwardly as required by the movement of the underlying supporting teeth 51.

The peak 56 formed by the slanted supporting surfaces 53 is substantially below the wire 38 so that it does not encounter interference from the grapevines. The covering surfaces 53 are also low enough to avoid being struck by the plates 16, 25, 32.

As the machine moves along the row, the grapes shaken from the vines fall primarily on the inclined surfaces 53 and are deflected laterally to the sorizontal receiving surfaces 49. Misalignment of the machine with respect to the grapevines is accommodated by independent bodily movement of the frames 42, 48 laterally relative to the crossbars 9 so that the grape catcher is substantially centered with respect to the vines. Local obstructions such as the trunks of the vines and the supporting posts are accommodated by flexing of the teeth 51 and by the independent movement of the frames 42-48.

What is claimed is:

1. A machine for harvesting fruit such as grapes grown on plants arranged in a row and having a frame movable along said row, wherein the improvement comprises shaker means on said frame in generally transverse alignment on opposite sides of said row having first portions at the outer sides of the plants in said row and other portions which penetrate concurrently the foliage of the plants to produce between said other portions a gripping engagement with the plants at the center of the row, and means for moving the shaking means to shake the fruit off the plants.

2. The machine of claim 1 in which the shaker means has vertically spaced shaker bars with leading ends at the outer sides of the vine and with trailing ends which penetrate the foliage of the plants to produce between said other portions a gripping engagement with the plants at the center of the row and free to deflect laterally of the row.

3. The machine of claim 2 in which the trailing ends of the shaker bars are in vertically staggered relation to each other.

4. The machine of claim 2 in which the trailing ends of the shaker bars in the absence of intervening plants are overlapped.

5. A machine for harvesting grapes or the like comprising a rectangular frame extending over the top of vines in a row, supporting means for the frame including wheels on opposite sides of the row, slides on the frame reciprocable crosswise of the row, a pair of plates depending from and reciprocable with the slides, said plates being opposite each other and respectively presented broadside to opposite sides of the vines and spaced apart to engage the outer sides of the vines, shaker bars having leading ends fixed to said plates and having trailing ends free and engaging the vines at the center of the row, said shaker bars converging toward the center of the row, and means for reciprocating the slides to shake the fruit off the vines.

6. A machine for harvesting grapes or the like comprising a frame movable along a row of vines, a pair of vertical shaker panels opposite each other and extending edgewise along the row and respectively presented broadside to opposite sides of the row and spaced to engage the outer sides of the vines in the row, shaker bars having leading ends fixed to said panels and having trailing ends free and engaging the vines at the center of the row, said shaker bars converging toward the center of the row, and means extending across the top of the row for reciprocating the panels crosswise of the row to shake the fruit off the vines.

7. The machine of claim 5 having a plurality of pairs of plates disposed along the length of the machine, each pair carrying its shaker bars, with the pair at the leading end of the machine more widely separated than the pair at the training end whereby as the machine traverses the row the vines are subjected to shaking which is greater at the trailing end of the machine than at the leading end of the machine.

8. A machine for harvesting grapes or the like supported for movement along a row of grapevines and comprising a pair of vertical shaker panels extending edgewise along the rows and presented broadside to opposite sides of the row and spaced to engage the outer sides of the vines in the row, arms fixed at one end to each panel and having the other ends extending from the panel toward the center of the row and inclined from the panels toward the trailing end of the machine as regards its direction of travel, and means extending across the top of the row for reciprocating the panels crosswise of the row to shake the fruit off the vines.

9. A machine for harvesting grapes or the like supported for movement along a row of grapevines and comprising a frame, shaker means on the frame movable horizontally back and forth alternately crosswise of the row, said shaker means extending from opposite sides of the vines into gripping engagement with the vines at the center of the row, means for reciprocating the shaker means crosswise of the row to shake the fruit off the vines, another frame adjacent the ground on each side of the row and movable along the row with the machine, a set of a plurality of flexible bodied arms extending inward and upward from each another frame and having tips meeting at the center of the row to form a peak shedding the fruit toward opposite sides of the row, said flexible arms inclining rearwardly as regards the direction of travel of the machine, and a flexible covering over each set of a plurality of arms providing a continuous yieldable fruit receiving surface overlying the arms and permitting individual movement of the arms without interfering with the integrity of the continuous fruit receiving surface, said flexible covering having edges secured to said another frame and looped over its set of arms.

10. A catcher for a machine for harvesting grapes or the like comprising a frame adjacent the ground on each side of a row of grapevines and movable along the row, a set of a plurality of flexible arms extending inward and upward from each frame and having tips meeting at the center of the row to form a peak shedding the fruit toward opposite sides of the row, said flexible arms inclining rearwardly as regards the direction of travel of the machine, and a flexible covering over each set of a plurality of arms providing a continuous yieldable fruit receiving surface overlying the arms and permitting individual movement of the arms without interfering with the integrity of the continuous fruit receiving surface, said flexible covering having edges secured to said frame and looped over its set of arms.

11. A machine for harvesting grapes or the like adapted to move along a row of grapevines comprising a frame movable along the vines, a plurality of sets of shaker means mounted on said frame, each set straddling the row and spaced to engage the vines, and having flexible bars with leading ends adjacent the outer sides of the vines and with trailing ends engaging the vines at the center of the row and free to deflect laterally of the row, and means for moving the sets of shaker means horizontally back and forth alternately crosswise of the row to shake the fruit from the vines, the means for moving the sets of shaker means crosswise of the row being out of phase with each other.

12. The grapes harvesting machine of claim 11 in which the spacing of the sets measured crosswise of the row decreases from the leading toward the trailing end of the machine as regards its direction of movement whereby the vines are funneled between the shaker means and subjected to progressively vigorous shaking.

13. A machine for harvesting grapes or the like adapted to move along a row of grapevines comprising a frame movable along the vines, a plurality of sets of shaker members mounted on said frame, each set straddling the row, each set having shaker bars with free ends of the bars inclined toward the center of the row and adapted to engage and grip vines at the center of the row and inclined rearwardly as regards the direction of movement of the machine, and means for reciprocating the sets of shaker members crosswise of the row to shake the fruit from the vines.

14. The machine of claim 13 wherein one of said sets of shaker members is offset relative to another of said sets of shaker members longitudinally of the machine, and the shaker bars of said another of said sets are in vertically staggered relation to the shaker bars of said one of said sets.

15. A machine for harvesting grapes or the like comprising vertical shaker panels extending edgewise along the row and presented broadside to opposite sides of the row and spaced to engage the vines in the row, flexible bars carried by the panels and converging toward the trailing end of the machine and the center of the row, and means extending across the top of the row for reciprocating the panels crosswise of the row to shake the fruit off the vines.

16. The machine of claim 13 in which the free ends of the flexible bars of one set of shaker members project between a set of shaker members nearer the trailing end of the machine.

17. A machine for harvesting grapes or the like grown on plants arranged in a row and having a frame movable along said row, wherein the improvement comprises shaker means carried by said frame arranged to travel along opposite sides of said row and including a group of generally horizontal flexible bars arranged to engage the plants on each side of said row and constantly extending lengthwise thereof, each group including at least one top flexible bar arranged to engage the top only of the adjacent side of the row, at least one bottom flexible bar arranged to engage the bottom only of the adjacent side of the row and at least one intermediate flexible bar arranged to engage the central part only of the adjacent side of the row, the flexible bars of one group converging with reference to the flexible bars of the other group toward the trailing end of the machine to grip the plants therebetween, and means carried by said frame for shaking said groups of bars.

18. A machine set forth in claim 17 wherein the trailing ends of said flexible bars of said one group are arranged close to the trailing ends of companion flexible bars of said other group, thereby to grip the plants at the center of the row.

19. A machine for harvesting grapes or the like from vines trained in rows, comprising a frame movable along the row to be harvested, shaker means straddling the row and movable back and forth alternately, said means having portions extending from opposite sides of the row and inclined toward each other into foliage penetrating and gripping engagement with the vines at the center of the row, and means for so moving the shaker means back and forth alternately as the frame moves along the row to shake the fruit off the vines.

20. A machine for harvesting grapes or the like from vines trained in rows, comprising a frame movable along the row of vines to be harvested, at least two sets of vine gripping means spaced from each other along the row, each set being mounted on the frame and straddling the row and each set having means extending from opposite sides of the row into gripping engagement with the vines at the center of the row, and means on the frame for moving one set of the gripping means back and forth crosswise of the row alternately relative to the other set of gripping means as the frame moves along the row to shake the fruit off the vines.

21. A machine for harvesting fruit such as grapes grown on plants arranged in a row and having a frame movable along said row, wherein the improvement comprises shaker means on said frame having portions which constantly remain as leading portions at the outer sides of the plants in said row and other portions which constantly remain as trailing portions and penetrate the foliage of the plants to produce a gripping engagement with the plants, and means for moving the shaking means to shake the fruit off the plants.

References Cited
UNITED STATES PATENTS

| | | | |
|---|---|---|---|
| 2,447,122 | 8/1948 | Horst. | |
| 2,586,834 | 2/1952 | Kreisman | 56—328 |
| 3,023,565 | 3/1962 | McKibben et al. | 56—330 |
| 3,126,692 | 3/1964 | Weygandt et al. | 56—330 |
| 3,165,879 | 1/1965 | Chapin | 56—330 |
| 3,184,902 | 5/1965 | Maffei | 56—130 |
| 3,184,908 | 5/1965 | Rust | 56—330 |
| 3,203,159 | 8/1965 | Weygandt et al. | 56—1 |
| 3,229,453 | 1/1966 | Harrett | 56—330 |
| 3,245,211 | 4/1966 | Weygandt et al. | 56—130 X |
| 3,325,984 | 6/1967 | Christie et al. | 56—330 |
| 3,344,591 | 10/1967 | Christie et al. | 56—330 |

ABRAHAM G. STONE, *Primary Examiner.*

P. A. RAZZANO, *Assistant Examiner.*